United States Patent
Elsherif et al.

(10) Patent No.: US 8,305,498 B2
(45) Date of Patent: Nov. 6, 2012

(54) APPARATUS AND METHOD FOR EQUALIZING ANALOG TV SIGNALS

(75) Inventors: Ahmed Ragab Elsherif, Giza (EG); Mohamed Abd El-Salam Ali, Ramadan (EG); Nabil Yousef Wasily, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 375 days.

(21) Appl. No.: 12/759,665

(22) Filed: Apr. 13, 2010

(65) Prior Publication Data

US 2011/0249185 A1    Oct. 13, 2011

(51) Int. Cl.
*H04N 17/00* (2006.01)
*H04N 5/21* (2006.01)
*H03M 1/12* (2006.01)

(52) U.S. Cl. .................. 348/607; 348/180; 348/572

(58) Field of Classification Search .................. 348/607, 348/614, 618, 624, 630, 612, 613, 180, 192; 375/229, 346, 349, 350; 382/167, 275
See application file for complete search history.

(56) References Cited

U.S. PATENT DOCUMENTS

| | | | | |
|---|---|---|---|---|
| 4,531,149 A * | 7/1985 | Lewis, Jr. | | 348/520 |
| 4,723,282 A * | 2/1988 | Marie et al. | | 380/215 |
| 5,223,920 A * | 6/1993 | Srivastava | | 348/605 |
| 5,396,293 A * | 3/1995 | Shellard | | 348/489 |
| 5,627,599 A * | 5/1997 | Hong | | 348/643 |
| 6,385,390 B1 * | 5/2002 | Kim et al. | | 386/318 |
| 7,324,162 B2 * | 1/2008 | Gudmondson et al. | | 348/572 |
| 2001/0010748 A1 * | 8/2001 | Murata et al. | | 386/40 |
| 2006/0221243 A1 * | 10/2006 | Huang et al. | | 348/572 |
| 2009/0115903 A1 * | 5/2009 | Zhu et al. | | 348/572 |

* cited by examiner

*Primary Examiner* — Victor Kostak
(74) *Attorney, Agent, or Firm* — Rahman LLC (57) ABSTRACT

An apparatus and method for equalizing analog TV signals includes an antenna that receives the signal data, wherein the signal data comprises a luminance carrier comprising a luminance channel and a chrominance carrier comprising a chrominance channel; an analog-to-digital converter coupled to receiving antenna that converts the received signal data to digital signal data; an instruction memory storing digital equalizer instructions; and a digital equalizer system, coupled to the memory and the analog-to-digital converter, wherein the digital equalizer system processes the digital equalizer instructions to estimate a noise variation of the luminance channel; equalize the luminance channel; and equalize the chrominance channel, wherein the equalization of the chrominance channel is separate and distinct from the equalization of the luminance channel.

20 Claims, 8 Drawing Sheets

APPARATUS AND METHOD FOR EQUALIZING ANALOG TV SIGNALS

BACKGROUND

1. Technical Field

The embodiments herein generally relate to dynamically equalizing a signal, and, more particularly, to dynamically equalizing video signal data.

2. Description of the Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In conventional video broadcast systems, a stationary receiver (e.g., a television receiver) includes a tuning device that receives a video signal (e.g., television signal) transmitted from a broadcasting station selected from among a plurality of broadcasting stations (channels). With conventional video broadcast systems, however, true mobility (e.g., mobile reception of a video signal) introduces complications not envisioned or addressed within the design framework (or relevant broadcast standards) of conventional video broadcast systems because such systems were designed for a traditionally fixed reception device (e.g., a stationary television set).

Examples of conventional video broadcast systems include both National Television Systems Committee (NTSC) standard and the Phase Alternate Line (PAL) standard. The NTSC/PAL systems are currently widely-spread for analog television signal broadcasting all over the world. Although this analog television signal was originally intended for stationary reception, new mobile device are becoming available that include tuning devices, which allow reception of these analog television signals.

Mobile reception of an analog television signal, however, is significantly more complicated than traditional reception of an analog television signal. For example, with a traditional fixed television set, a user can change the direction of the receiving antenna until a satisfactory signal quality is received. Mobile reception does not offer this degree of flexibility. With mobile reception, an analog television signal experiences time-varying channel quality (e.g., movement of the mobile receiver) that results in fading and receiving signals at different levels including severely attenuated time regions (e.g., deep fades or dead regions). Additionally, poor video reception quality may be encountered due to shadowing, and large distances from the conventional video broadcast system transmitter. Consequently, with mobile reception, the received video signal does not simply experience a static signal-to-noise ratio (as found in conventional video broadcast systems), but rather undergoes a variable signal-to-noise ratio that effects video quality.

SUMMARY

In view of the foregoing, an embodiment herein provides a system for equalizing signal data, the system comprising an antenna that receives the signal data, wherein the signal data comprises a luminance carrier comprising a luminance channel and a chrominance carrier comprising a chrominance channel; an analog-to-digital converter coupled to receiving antenna that converts the received signal data to digital signal data; an instruction memory storing digital equalizer instructions; and a digital equalizer system, coupled to the memory and the analog-to-digital converter, wherein the digital equalizer system processes the digital equalizer instructions to estimate a noise variation of the luminance channel; equalize the luminance channel; and equalize the chrominance channel, wherein the equalization of the chrominance channel is separate and distinct from the equalization of the luminance channel.

Such a system may further comprise an automatic gain controller coupled to the antenna and the analog-to-digital converter, wherein the automatic gain controller may automatically adjust the received signal data and the analog-to-digital converter may convert the adjusted signal data to digital video signal data. Moreover, the signal data may comprise an analog television signal and the analog television signal may comprise a blanking period and the blanking period may comprise an Hsync, a front porch, and a back porch, and wherein the Hsync, the front porch, and the back porch may comprise an amplitude of the analog television signal at a predetermined value for a predetermined amount of time.

Furthermore, the digital equalizer may comprise a luminance equalizer, wherein the luminance equalizer equalizes the luminance channel.

In addition, in such a system, the luminance equalizer may sample the blanking period; accumulate the samples; calculate a received sample mean by calculating a mean of the samples; and calculate a channel estimate by dividing the received sample mean by a stored sample mean. Moreover, the luminance equalizer may repeat the calculated channel estimate. Furthermore, the luminance equalizer may interpolate the channel estimate by linearly interpolating the channel estimate with the stored channel estimate and storing the interpolated channel estimate as the stored channel estimate. Additionally, the signal data may comprise an analog television signal and the analog television signal may comprise a color burst, and the digital equalizer may comprise a chrominance equalizer to equalize the chrominance channel.

Additionally, in such a system, the chrominance equalizer may comprise at least one of an Root-Mean-Square ("RMS") equalizer and a V-demod equalizer, wherein the V-demod equalizer may comprise a demodulator, and wherein the V-demod equalizer equalizes the chrominance channel based on an output of the demodulator. Moreover, the RMS equalizer may sample the color burst; accumulate the color burst; calculate a mean of the color burst; subtract the color burst mean from the received color burst producing a color-burst-without-dc signal; calculate a square of the color-burst-without-dc signal; calculate a root-mean-square of the color-burst-without-dc signal; and equalize the chrominance channel by an equalized chrominance channel obtained by dividing the calculated root-mean-square of the color-burst-without-dc signal by $$\left(\frac{A}{\sqrt{2}}\right),$$

where A is an amplitude of a transmitted color burst. In addition, the signal data may comprise a composite analog television signal and the composite analog television signal may comprise a V channel, and wherein the V-demod equalizer may demodulate the V channel; estimate a chroma channel from the demodulated V channel; and equalize received the signal data by the estimated chroma channel.

Another embodiment herein provides a method of equalizing signal data, the method comprising receiving the signal data, wherein the signal data comprises a luminance carrier comprising a luminance channel and a chrominance carrier comprising a chrominance channel; converting the signal data to digital signal data; estimating a noise variation of the luminance channel; equalizing the luminance channel; and equalizing the chrominance channel, wherein the equalization of the chrominance channel is separate and distinct from the equalization of the luminance channel.

In such a method, the signal data may comprise an analog television signal and the analog television signal may comprise a blanking period and the blanking period may comprise an Hsync, a front porch, and a back porch, and wherein the Hsync, the front porch and the back porch may comprise an amplitude of the analog television signal at a predetermined value for a predetermine amount of time. Furthermore, equalizing the luminance channel may comprise sampling the blanking period; accumulating the samples; calculating a received sample mean by calculating a mean of the samples; and calculating a channel estimate by dividing the received sample mean by a stored sample mean. In addition, equalizing the luminance channel may comprise at least one of repeat the calculated channel estimate, and linearly interpolating the channel estimate with the stored channel estimate and storing the interpolated channel estimate as the stored channel estimate. Moreover, the signal data may comprise an analog television signal and the analog television signal may comprise a color burst. Additionally, equalizing the chrominance channel may comprise sampling the color burst; accumulating the color burst; calculating a mean of the color burst; subtracts the color burst mean from the received color burst producing a color-burst-without-dc signal; calculating a square of the color-burst-without-dc; calculating a root-mean-square of the color-burst-without-dc; and equalizing the chrominance channel by an equalized chrominance channel obtained by dividing the calculated root-mean-square of the color-burst-without-dc signal by $$\left(\frac{A}{\sqrt{2}}\right)$$

where A is an amplitude of a transmitted color burst. Moreover, equalizing the chrominance channel may comprise demodulating the V channel; estimating a chroma channel from the demodulated V channel; and equalizing the chrominance channel to the estimated chroma channel. Furthermore, such a method may further comprise automatically adjusting the received signal data.

Another embodiment herein provides a computer-readable medium encoded with a method written in computer-readable instructions that, when executed by a adaptive filter apparatus, instructs the adaptive filter apparatus to perform the method, the method comprising receiving the signal data, wherein the signal data comprises a luminance carrier comprising a luminance channel and a chrominance carrier comprising a chrominance channel; converting the signal data to digital signal data; estimating a noise variation of the luminance channel; equalizing the luminance channel by sampling a blanking period; accumulating the samples; calculating a received sample mean by calculating a mean of the samples; and calculating a channel estimate by dividing the received sample mean by a stored sample mean; and equalizing the chrominance channel, wherein the equalization of the chrominance channel is separate and distinct from the equalization of the luminance channel.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide an apparatus and method for simply and efficiently equalizing video transmissions under various channel conditions. Referring now to the drawings, and more particularly to FIGS. 1 through 8, where similar reference characters denote corresponding features consistently throughout the figures, there are shown preferred embodiments.

Video transmission occurs through a number of different mediums and according to a number of different mechanisms. For example, the NTSC/PAL systems are currently widely-spread for analog, over-air, television (TV) signal broadcasting all over the world. Although this transmitted signal is analog in nature, and conventionally is processed as an analog signal, embodiments described below process such video transmissions digitally to achieve enhanced performance when compared to traditional analog processing techniques. Furthermore, while the analog TV signal was originally intended for stationary, terrestrial reception; embodiments described herein allow an analog TV signal to be efficiently received in a mobile environment as well. The PAL system, as an example, uses 625 lines per frame with a frame rate of 25

Hz. As an addition to the existing black-and-white TV signal, a chrominance carrier was added for the PAL system at 4.43 MHz. The composite signal of the PAL system (e.g., Color, Video, Blank, Sync or "CVBS") can be modeled as: CVBS=Y+U sin($w_c$t)+/−V cos($w_c$t)+sync signals where $w_c$=2*pi*$f_c$ and $f_c$=4.43 MHz.

Figure 1:
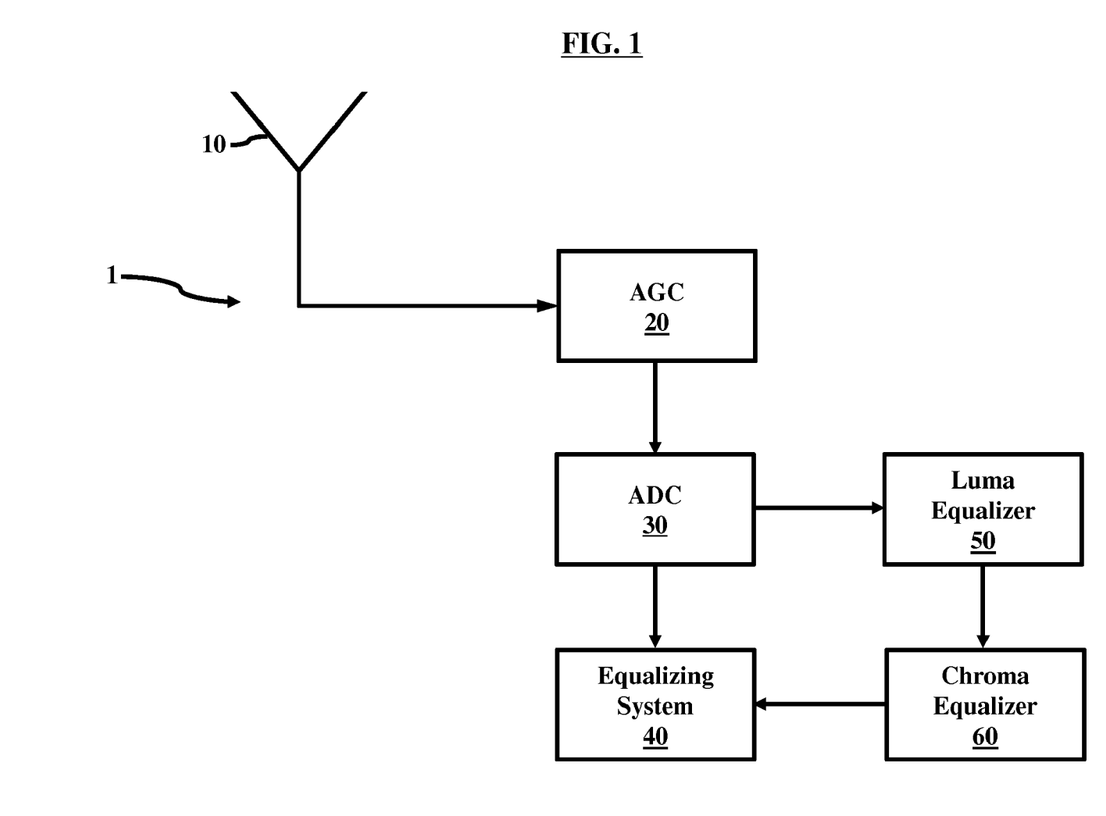
FIG. 1 illustrates a block diagram of an equalizing apparatus according to an embodiment herein.

FIG. 1 illustrates a block diagram of an apparatus for equalizing signal data (e.g., video signal data, as received during over-air reception) according to an embodiment herein. As shown in the embodiment of FIG. 1, equalizing apparatus 1 includes a receiving antenna 10, an automatic gain controller ("AGC") 20, an analog-to-digital converter ("ADC") 30, equalizing system 40. As further shown in FIG. 1, equalizing apparatus 1 includes a luminance single-tap equalizer ("Luma equalizer") 50 and a chrominance single-tap equalizer ("Chroma equalizer") 60. In addition, while not shown in FIG. 1, a display device (e.g., display adaptor 321 shown in FIG. 8) and a processing device (e.g., CPU 310, shown in FIG. 8) may be coupled to equalizing system 40 to allow received video transmission to be displayed.

As known to those skilled in the art, additional components may be incorporated into equalizing apparatus 1 without undue experimentation. Examples of such components include, but are not limited to: digital signal processors, digital-to-analog converters, random access memories, read-only memories, etc. In addition, equalizing apparatus 1 describes one category of device of many possible categories of devices. For example, although equalizing apparatus 1 includes equalizing system 40, equalizing apparatus 1 with equalizing system 40 represents one device category, other device categories include, but are not limited to devices that replace equalizing system 40 with a digital signal processor, a general purpose processor, a Field Programmable Gate Array device ("FPGA") or a reconfigurable computing device. Thus, for example, a digital signal processor (not shown in FIG. 1) may read equalizing instructions from a memory (not shown in FIG. 1), and execute those equalizing instructions. Other components shown in FIG. 1 may be similarly substituted with other components to describe additional categories of devices. In addition, embodiments described herein may be limited to one device category or may include all device categories.

Equalizing apparatus 1 may receive analog video signal data via receiving antenna 10. For example, receiving antenna 10 may receive, at a 13.5 MHz carrier frequency, video signal data that includes, for example, Y/C component signal data with 702 pixels per horizontal line and 288 lines per vertical field or 710 pixels per horizontal line and 242 lines per vertical field for PAL or NTSC respectively. Receiving antenna 10 may then be coupled to AGC 20. While not shown in FIG. 1, AGC 20 may feedback an average of output signal level (e.g., received analog video signal data) to adjust a gain on that signal level to an appropriate level for a range of input signal levels. In the embodiment shown in FIG. 1, AGC 20 is coupled to ADC 30, where ADC 30 converts the received analog video signal data to digital video signal data. ADC 30 is coupled to equalizing system 40, which may execute instructions, described below, that instruct equalizing system 40 to improve video signal quality—e.g., by equalizing a multi-path channel received by receiving antenna 10. In addition, while not shown in FIG. 1, equalizing system 40 may be coupled to a display device to display the filtered digital video signal data.

Figure 2:
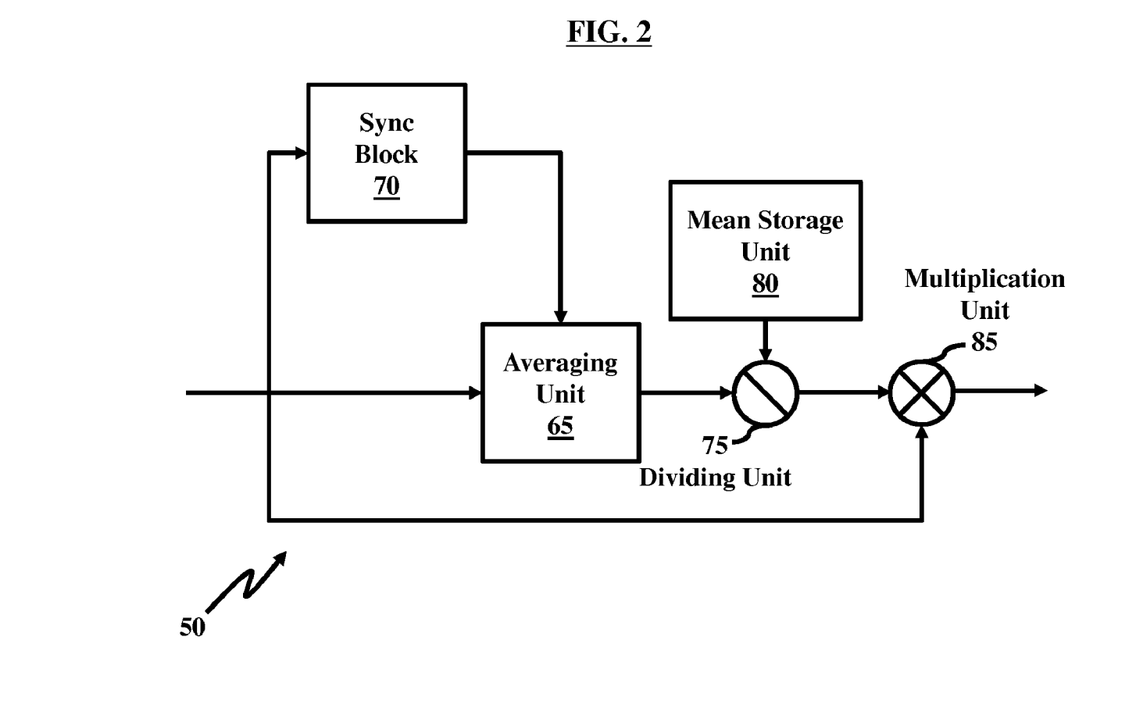
FIG. 2 illustrates a block diagram of luminance equalizing apparatus according to an embodiment herein.

FIG. 2, with reference to FIG. 1, illustrates a block diagram of a luminance single-tap equalizer according to an embodiment herein. As shown in FIG. 2, Luma equalizer 50 includes averaging unit 65, sync block 70, dividing unit 75, mean storage unit 80, and multiplication unit 85. Mean storage unit 80 may, in an embodiment herein, store a predetermined value stored in an register. Such a predetermined value is determined for each analog television standard (e.g., PAL, NTSC, and SECAM). In FIG. 2, a received CVBS signal (e.g., using receiving antenna 10) is averaged (e.g., averaging unit 65) over the blanking period of each line. The blanking period of each line (e.g., Hsync, Front porch, and Back porch) is determined from a synchronization block (e.g., sync block 70). The resulting average (e.g., obtained by averaging unit 65) can be divided (e.g., by dividing unit 75) by the previously-known mean (e.g., using mean storage unit 80) of the transmitted signal at the blanking period giving an estimate for the channel amplitude and the channel inverse. In fact, the channel inverse is also directly obtained and multiplied (e.g., multiplication unit 85) by the received CVBS signal (e.g., using receiving antenna 10) to produce the equalized CVBS signal (not shown). The estimated channel is a single value that is updated for each line (e.g., a horizontal line of video) and used to equalize the corresponding line (not shown).

For example, with fading channels (e.g., as a result of a multi-path channel), the received signal (e.g., using receiving antenna 10) amplitude may go very low with a rate depending on the Doppler frequency (which is directly proportional to the velocity of the receiver). If there is no fast level control, the signal brightness will decrease as the signal amplitude decreases. As shown in FIG. 2, Luma equalizer 50 tracks the amplitude of the received signal (e.g., using receiving antenna 10). In addition, level control in Luma equalizer 50 can be done by measuring the amplitude of the known parts of the received CVBS signal (where the Blanking period includes: Hsync, Front porch, and Back porch) and comparing the measured amplitude (e.g., using equalizing system 40) with a known corresponding amplitude of the transmitted signal (as described in further detail below). Thereafter, the amplitude of the received CVBS signal (e.g., using receiving antenna 10) is averaged (e.g., using averaging unit 65) over the blanking period of a line and divided (e.g., using dividing unit 75) by the known mean (e.g., stored in mean storage unit 80) amplitude of the transmitted signal producing an estimate for the channel seen by the Luma carrier at this line (not shown). This channel estimate can be averaged (e.g., averaging unit 65) over a frame or a block of lines (not shown). As the averaging period increases, a less noisy estimate is obtained but it may be incorrect in cases of high Doppler frequencies where the received CVBS signal (e.g., using receiving antenna 10) undergoes fast channel variations.

For high Doppler frequencies, a channel estimated using other systems may significantly vary within the same line especially at the deep fades at which the envelope of the CVBS signal has a large slope. In these cases, the channel seen by the blanking period will be different from the channel seen by the rest of the line. This results in degradation in the performance for the right part of the displayed lines whereas the left part is acceptable, as it experienced a channel that is close to the estimated channel. One embodiment described herein addresses this problem found in other systems by interpolating the channel estimates of two consecutive lines to get the channel in the rest of the line. Additional embodiments described herein may use higher order interpolation, with added complexity and delays. To avoid excessive complexity and delays, however, linear interpolation is sufficient in most circumstances. One embodiment of a linear interpolation method (described in further detail below) gives a per-pixel channel estimate and, thus, allows for per-pixel equalization which significantly enhances the performance in case of high Doppler frequencies (e.g., large receiver velocity).

Figure 3:
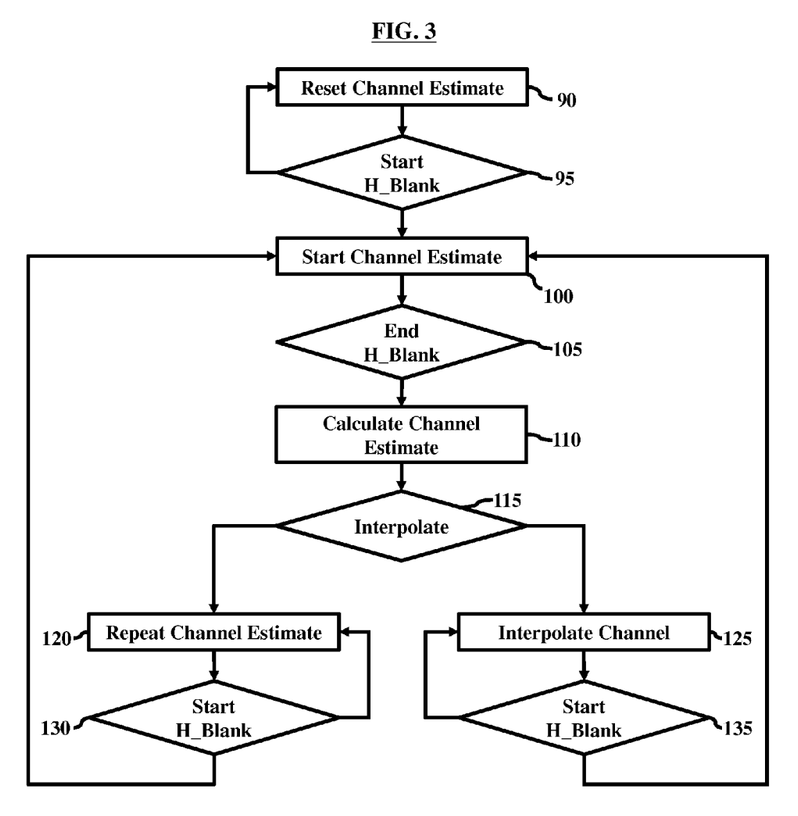
FIG. 3 illustrates a flow diagram of a luminance equalizing method according to an embodiment herein.

FIG. 3, with reference to FIGS. 1 and 2, is a flow diagram illustrating a linear interpolation method according to an embodiment herein. While not shown, Luma equalizer 50 may execute the method shown in FIG. 3 (e.g., by executing instructions readable by Luma equalizer 50). In FIG. 3, an equalizer (e.g., Luma equalizer 50) starts in step 90 by resetting a channel estimate. For example, Luma equalizer 50 may start executing instructions that configure Luma equalizer 50 to start at the 'Channel_est_reset' state (not shown) where a variable sum_rx_sig_blanking (not shown) is set to 0. Step 95 determines whether an H_Blank signal has been received (e.g., using receiving antenna 10) and subsequently starts accumulating received CVBS samples (e.g., using ADC 30) to begin a channel estimate at step 100. Accumulation of received CVBS samples (e.g., using ADC 30) ends when the H_Blank signal ends, as shown in step 105. For example, at the start of the horizontal blanking period of each line, the Luma equalizer 50 executes instructions that configure Luma equalizer 50 to go to the state 'Channel_est_acc'—where in the Channel_est_acc state, incoming CVBS samples (e.g., using ADC 30) are accumulated. In step 110, Luma equalizer 50 begins calculating the channel estimate and determines whether to interpolate the resulting channel estimate. Thus, for example, at the end of the horizontal blanking period (e.g., as signaled by sync block 70, shown in FIG. 2), Luma equalizer 50 executes instructions that configure Luma equalizer 50 to enter a Calc_channel'—the Calc_channel state instructs Luma equalizer 50 to divide (e.g., using dividing unit 75) the accumulated sum (e.g., step 100) by a horizontal blanking period to give the signal mean_rx_sig_blanking. Furthermore, as shown in step 110, Luma equalizer 50 may subsequently execute instructions to configure Luma equalizer 50 to divide the calculated mean (e.g., step 110), by the already-known mean of the transmitted signal (e.g., as stored in mean storage unit 80). At step 115, the method of FIG. 3 determines whether the interpolation mode has been enabled. When the interpolation mode is not enabled, the method of FIG. 3 repeats the calculated channel estimate in step 120 and begins searching for another start of an H_Blank signal (e.g., step 130) to afterwards return to step 100. When the interpolation mode is enabled, the method of FIG. 3 interpolates the calculated estimation (e.g., using Luma equalizer 50) in step 125 and begins searching for another start of an H_Blank signal (e.g., step 135) to afterwards return to step 100. For example, if the interpolation mode has not been enabled, then Luma equalizer 50 executes instructions to use a low complexity repetition mode—e.g., the channel estimate is kept constant (e.g., by storing in a register, not shown in FIG. 3) until the next estimated channel at the next line is calculated. In the interpolation mode, however, Luma equalizer 50 executes instructions to use two channel estimates for two successive lines and those two channel estimates are linearly interpolated to give a more accurate channel estimate at each pixel in the line.

The square of the estimated channel power (e.g., as estimated by the method shown in FIG. 3) gives an indication of the received signal quality (e.g., using receiving antenna 10) at each pixel. This signal quality measure could be used to enhance the quality of the displayed video (not shown). The Signal to Noise Ratio (SNR) is a more accurate measure of signal quality which requires estimating another variable—noise variance.

Figure 4:
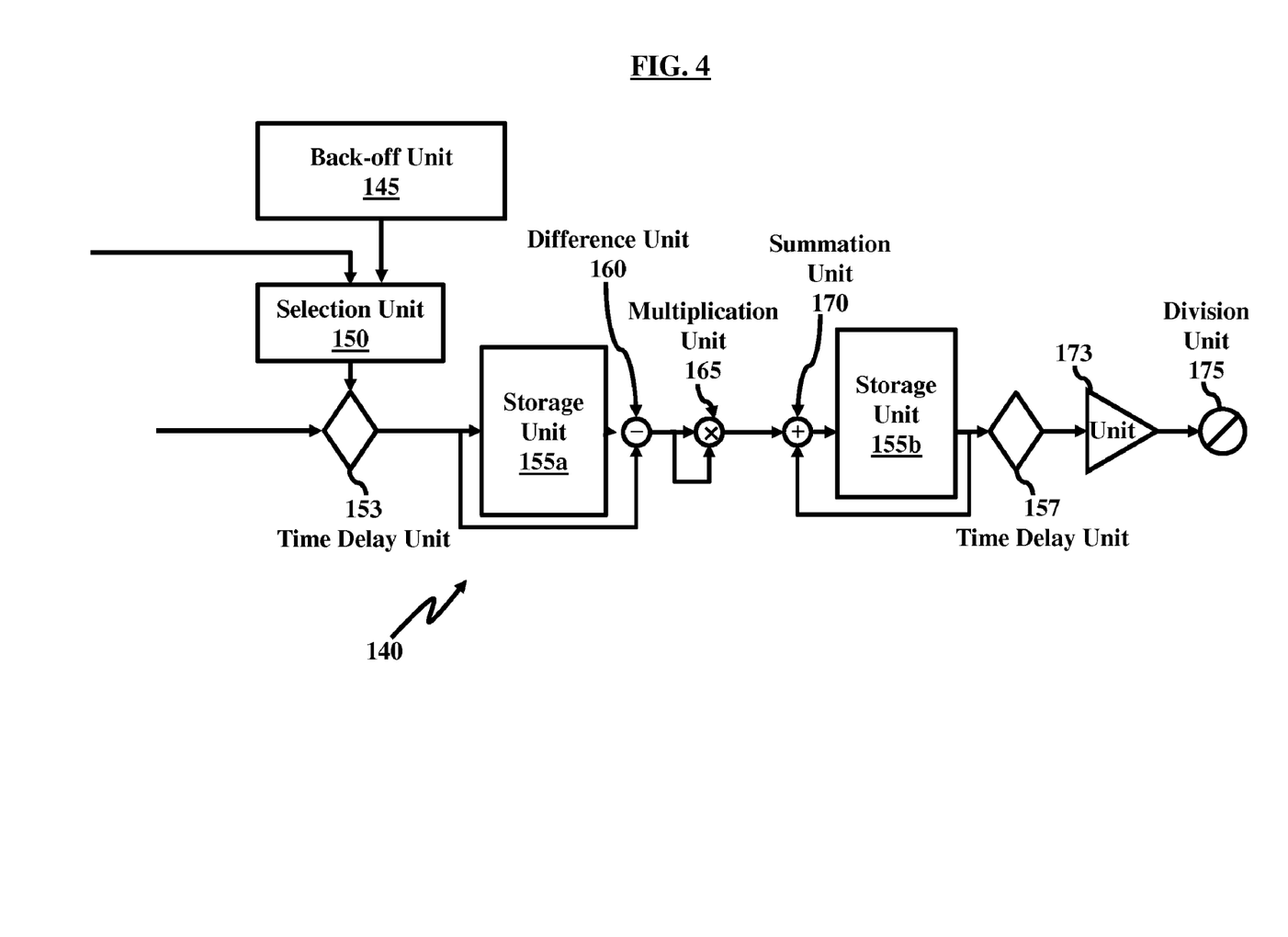
FIG. 4 illustrates a block diagram of noise variance estimation apparatus according to an embodiment herein.

FIG. 4, with reference to FIGS. 1 through 3, is a block diagram illustrating a noise estimation apparatus according to an embodiment herein. While not shown in FIG. 4, Luma equalizer 50 (shown in FIG. 1) includes noise estimation apparatus 140. In another embodiment noise estimation apparatus 140 is a separate component to equalizing apparatus 1 (shown in FIG. 1) and is coupled to Luma equalizer 50. As a separate component, noise estimation apparatus 140 can be used with the channel estimate calculated by Luma equalizer 50 to give an estimate of the SNR that can be used later as an accurate measure for the signal quality. To overcome the limitation of conventional systems, noise estimation apparatus 140 uses a received Hsync pulse (e.g., using receiving antenna 10) for noise variance estimation. The equations below describe the behavior of one embodiment of noise variance estimation apparatus 140. In the following equations, let D be the DC level of a received Hsync pulse (e.g., using receiving antenna 10). Then a received signal (e.g., using receiving antenna 10) at the Hsync duration can be modeled as $D_r = Rx_{Hsync} = h*D + n$, assuming a single path fading channel for simplicity where h is the channel amplitude and n is an Additive White Gaussian Noise ("AWGN") process. The difference between two successive samples is given by: $D_1 - D_2 = h*D + n_1 - h*D - n_2 = n_1 - n_2 = w$, where $D_1$ is a first of two samples, $D_2$ is a second successive sample, and w is an AWGN process having twice the variance of the original AWGN process, n. If the power of this random process is calculated and averaged over time, an estimate of twice the noise variance is obtained.

As shown in FIG. 4, noise variance estimation apparatus 140 includes back-off unit 145 (where back-off unit 145 may include a register containing a programmable value for the back-off), selection unit 150, time delay unit 153, sample storage unit 155a and 155b (e.g., a register), time delay unit 157, difference unit 160, multiplication unit 165, summation unit 170, and division unit 175. As shown in the embodiment of noise variance estimation apparatus 140 of FIG. 4, selection unit 150 is used to select the Hsync pulse (e.g., as received by receiving antenna 10, shown in FIG. 1) samples after excluding some samples from both edges to avoid the pulse edges (e.g., as calculated by back-off unit 145). Back-off unit 145 uses a programmable value that is set to guarantee avoiding pulse edges in multi-path channels. The difference (e.g., using difference unit 160) between each two consecutive samples (where storage unit 155a stores a previous sample) is calculated and then squared (e.g. using multiplication unit 165). The square of the difference is then summed (e.g., using summation unit 170) over a window of programmable length. This occurs using the summation unit 170 together with the second delay element (e.g., as stored in storage unit 155b), which holds the value of the summation at the previous time instant. At the end of the programmable window, the accumulated value is divided (e.g., by division unit 175) by twice the window length (e.g., unit 173) giving an estimation of the noise variance. While not shown in FIG. 4, the programmable window length may be chosen to be a field, a frame, or any other value. In addition, as the window length increases, more averaging is done and a better noise variance is obtained at the expense of increased bit width. The noise variance of wireless signals is generally slowly changing, which allows for safely using a large window length to get a better estimate. While not shown in FIG. 4, at the end of the estimation window, a new estimate of the noise variance is obtained and the accumulator that contains the sum of the squared differences (e.g., storage unit 155b) is reset for a new calculation. Once an estimate of the noise variance is obtained, it is kept constant until a newer estimate is obtained at the end of the next estimation window.

Figure 5:
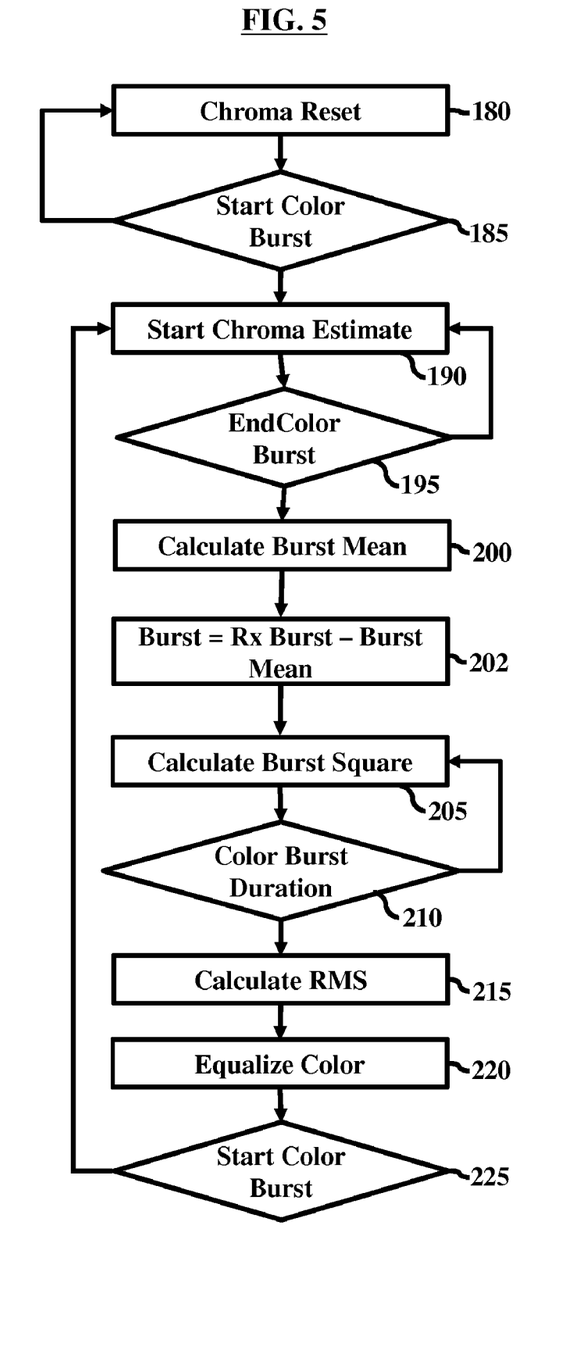
FIG. 5 is a flow diagram illustrating an chrominance equalizing method according to an embodiment herein.
Figure 6:
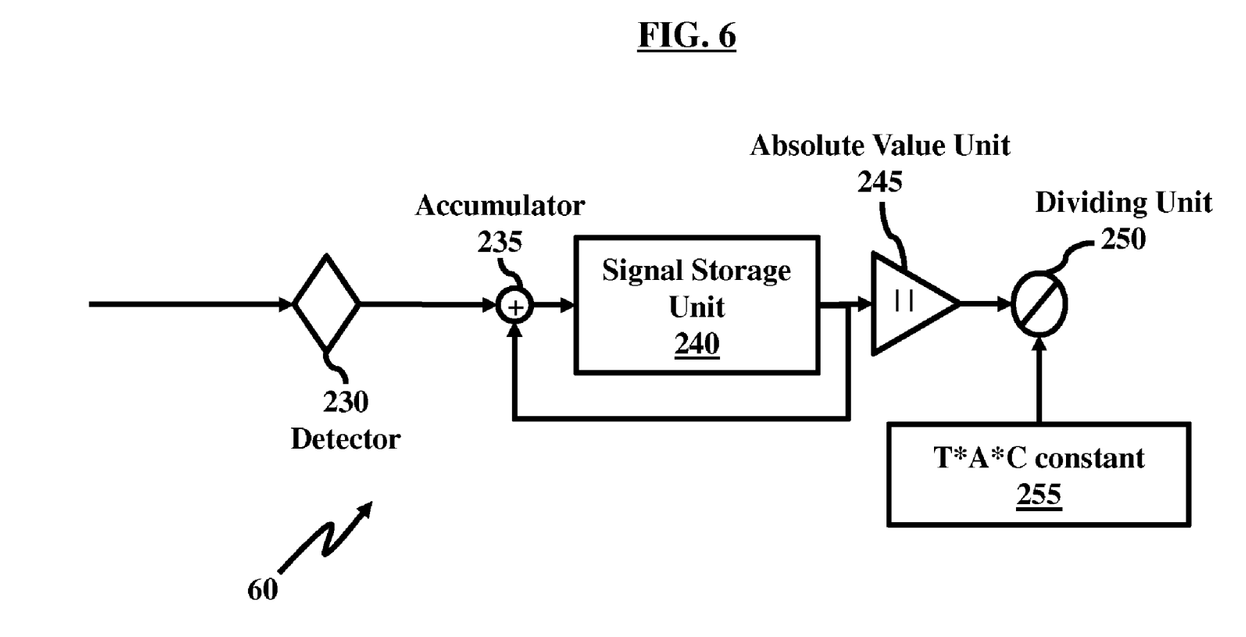
FIG. 6 is a block diagram illustrating another chrominance equalizing method according to an embodiment herein.

When receiving multi-path channels (e.g., using receiving antenna 10), equalizing system 40 also equalizes chroma carrier frequency amplitude variation that is not equalized by the Luma single-tap equalizer. In conventional systems, this chroma carrier frequency amplitude variation causes the chrominance components (U/V or Cb/Cr) to experience amplitude variation over time and leads to a 'Color Flashing' effect. Chroma equalizer 60, shown in FIG. 1, addresses this shortcoming found in conventional systems. FIGS. 5 and 6 illustrate two different embodiments of Chroma equalizer 60 (shown in FIG. 1). The embodiments of Chroma equalizer 60 shown in FIGS. 5 and 6 are not mutually exclusive, and embodiments of equalizing system 40 (shown in FIG. 1) may include the embodiments of Chroma equalizer 60 shown in FIG. 5 and in FIG. 6.

FIG. 5 is a flow diagram illustrating a linear interpolation method according to an embodiment herein. While not shown, Chroma equalizer 60 may execute the method shown in FIG. 5 (e.g., by executing instruction readable by Chroma equalizer 60). The method of FIG. 5 begins at the start of the color burst, as indicated by a synchronization block (not shown). The received CVBS signal (not shown) is accumulated at color burst time duration at step 190 producing the signal sum_color_burst. The burst mean is then calculated at step 200 by dividing the obtained sum of color burst by the duration of the color burst (which is predetermined value for each analog TV standard). This calculated mean is then subtracted from the received color burst at step 202 to produce the signal burst-without-dc. The square of the signal burst-without-dc is calculated and accumulated at step 205 for the period of the color burst giving an estimate of the sum of the square of the color burst over the color burst duration. Step 215 first calculates the mean of the square of the color burst by dividing the calculated sum by the color burst duration. The root-mean-square ("rms") is then calculated by performing a square root function to the obtained mean of the square of the color burst.

Stated another way, according to the embodiment shown in FIG. 5, a received color burst signal (e.g., using receiving antenna 10) may be modeled as: $CB = D + A^* H_{ch}^* \sin(w_{cg} t)$, where D is the back porch level (which is also the mean of the color burst), A is the amplitude of the transmitted color burst, $H_{ch}$ is the channel amplitude seen at the chroma carrier, $w_{ch}$ is the chroma carrier frequency. Thus, the embodiment shown in FIG. 5 first calculates the mean of the color burst, $\hat{D}$ (e.g., step 200). The estimated color burst mean $\hat{D}$ is then subtracted from the received color burst (e.g., step 205). The rms of $CB - \hat{D}$ is then calculated (e.g., step 215) which equals:

$$\frac{AH_{ch}}{\sqrt{2}}.$$

The chroma channel can thus be calculated as:

$$\frac{\text{rms}(CB - \hat{D})}{\left(\frac{A}{\sqrt{2}}\right)}$$

(e.g., step 215). The estimated chroma channel is then used to directly equalize the amplitude of the U and V components (e.g., step 220). The embodiment shown in FIG. 5 uses a buffer of twice the color burst duration as the color burst mean is first calculated then removed from the same color burst (e.g., step 202).

FIG. 6 is a block diagram illustrating a V-demod Chroma equalizer 60 according to an embodiment herein. V-demod Chroma equalizer 60 includes detector 230, accumulator 235, V_demod_out signal storage unit 240, absolute value unit 245, dividing unit 250 and T*A*C constant 255. According to FIG. 6, the mean of the V_demod_out signal is accumulated (e.g., using accumulator 235) over the duration of the color burst (as determined by detector 230). The absolute of the resulting sum is then calculated (e.g., using absolute value unit 245). The chroma channel is then calculated by dividing (e.g., using dividing unit 250) the resulting absolute value (e.g., absolute value unit 245) by a constant (e.g., T*A*C constant 255) that is predetermined for each analog TV standard.

As shown in FIG. 6, the estimated chroma carrier frequency is obtained from a phase-locked loop used to lock on the chroma carrier frequency and phase. This estimated chroma carrier frequency drives a cos/sin LUT to generate an estimate of the carrier that was used in the transmitter for modulating the U and V signals. Let ω be the chroma carrier and ω' be the estimated carrier frequency. Considering the PAL system as an example, the transmitted signal during color bursts is modeled by $\sin(\omega t + 3^* pi/4)$ for one line and $\sin(\omega t + 5^* pi/4)$ for the next line. In the presence of fading channels, the received color burst signal can be simplified to be $AH_{ch} \sin(\omega t + 3^* pi/4)$ and $AH_{ch} \sin(\omega t + 5^* pi/4)$ for consecutive lines. Thus, the V demodulator output for the first line is:

$$V_{out\ldots 1} = LPF\left\{AH_{ch}\sin\left(\omega t + \frac{3\pi}{4}\right)\cos(\omega' t + \varphi)\right\} = \frac{AH_{ch}}{2}\sin\left(\Delta\omega t + \frac{3\pi}{4} - \varphi\right)$$

where Δw is the frequency difference between the transmitted chroma carrier frequency and the estimated chroma carrier frequency and φ is the phase difference. The V-demod-out for the next line is given by:

$$V_{out\ldots 2} = \frac{AH_{ch}}{2}\sin\left(\Delta\omega t + \frac{5\pi}{4} - \varphi\right)$$

The idea here is to integrate the V-demod-out signal over the burst duration to get a time-invariant value for each line given by the following equation:

$$Acc1 = \int_0^T V_{out\ldots 1} dt = \frac{AH_{ch}}{2}\left[\frac{1}{\Delta\omega}\cos\left(\Delta\omega t - \varphi + \frac{5\pi}{4}\right)\right]_0^T = \frac{AH_{ch}}{4\pi\Delta f}\left[\cos\left(2\pi\Delta fT - \varphi + \frac{5\pi}{4}\right) - \cos\left(-\varphi + \frac{5\pi}{4}\right)\right]$$

where T is the burst duration in samples. This time-invariant value for the next line will be:

$$Acc2 = \frac{AH_{ch}}{4\pi\Delta f}\left[\cos\left(2\pi\Delta fT - \varphi + \frac{3\pi}{4}\right) - \cos\left(-\varphi + \frac{3\pi}{4}\right)\right].$$

When the Chroma PLL locks, i.e. Δf→0, φ→0, $Acc1 = T^* A^* H_{ch}^* \sin(3^* pi/4)$, $Acc2 = T^* A^* H_{ch}^* \sin(5^* pi/4)$.

Stated another way, the chroma channel estimate can be obtained as: $H^{\hat{}}_{ch}=|Acc|/(T*A*\sin(3*pi/4))$ where Acc is Acc1 in one line and Acc2 in the other line. This idea can be generalized to be $H^{\hat{}}_{ch}=|Acc|/(T*A*C)$, where C is a constant that is determined for each analog TV standard. As shown above, the V-demod-based chroma equalizer depends on the lock of the Chroma PLL. When the Chroma PLL goes out of lock for any reason, the last estimated chroma channel should be used. The block diagram of the proposed V-demod-based chroma equalizer is shown in FIG. 6.

The RMS-based chroma equalizer is more complex than the V-demod-based chroma equalizer as it requires a square root operation. Moreover, the performance of the two solutions is comparable. To enhance the noisy chroma channel estimate of either method, a moving average window of a programmable length (L) is used on the chroma channel estimate. The channel estimate of the last L lines should be maintained in a buffer of length L where the chroma channel estimate is obtained as a single value per line. The moving average window can be simply implemented by a circular buffer using the following recursive equation: sum_chroma_channel_buffer=sum_chroma_channel_buffer—chroma_channel_buffer[buffer_ptr]+chroma_channel, where chroma_channel_buffer is the circular buffer of length L, chroma_channel is the channel estimate of the current line, and buffer_ptr is the circular buffer pointer that wraps on L. In one embodiment herein, the value chroma_channel_buffer[buffer_ptr] in the recursive equation above refers to the channel estimate of the line L+1 lines back in time. The new channel estimate is written in chroma_channel_buffer[buffer_ptr]: chroma_channel_buffer[buffer_ptr]=chroma_channel. The new averaged value of the chroma channel is then obtained by chroma_channel=sum_chroma_channel_buffer/L.

Unlike the per-pixel Luma channel estimate, the chroma channel estimate doesn't need to be estimated per pixel as the eye is less sensitive to chrominance variations. This reduces the complexity of the chroma single-tap equalizer.

Figure 7:
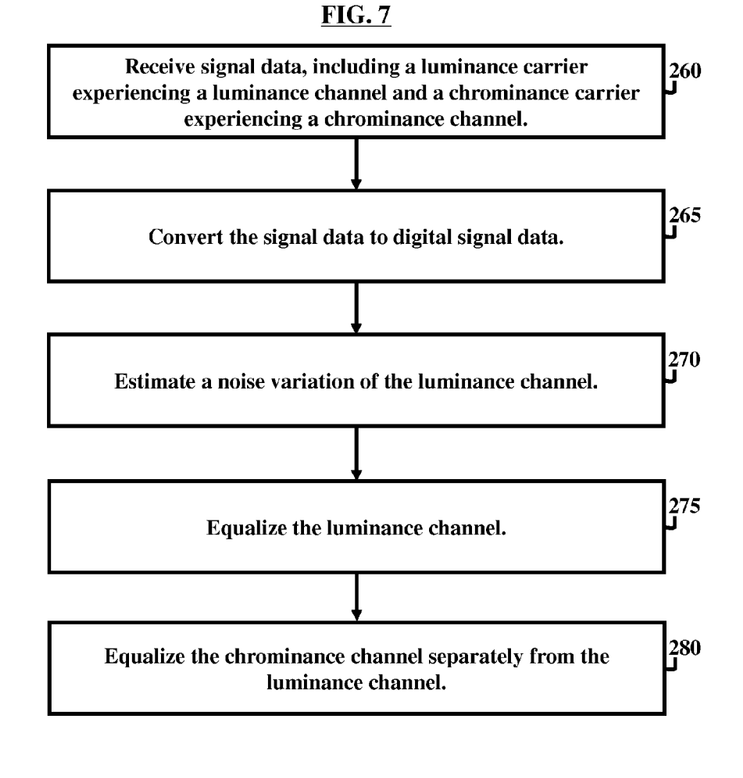
FIG. 7 is a flow diagram illustrating a preferred method according to an embodiment herein.

FIG. 7, with reference to FIGS. 1 through 6, illustrates a flow diagram according to an embodiment herein. In the method of FIG. 7, step 260 describes receiving signal data (e.g., using receiving antenna 10, shown in FIG. 1), including a luminance carrier experiencing a luminance channel and a chrominance carrier experiencing a chrominance channel. Step 265 describes converting the signal data to digital signal data (e.g., ADC 30, shown in FIG. 1). Step 270 describes estimating a noise variation of the luminance channel (e.g., noise variance estimation apparatus 140, shown in FIG. 4). Step 275 describes equalizing the luminance channel (e.g., Luma equalizer 50, shown in FIG. 1). In step 280, the method of FIG. 7 describes equalizing the chrominance channel separately from the luminance channel (e.g., Chroma equalizer 60, shown in FIG. 1).

In such a method, the signal data may comprise an analog television signal and the analog television signal may comprise a blanking period and the blanking period may comprise an Hsync, a front porch, and a back porch, and wherein the Hsync, the front porch and the back porch may comprise an amplitude of the analog television signal at a predetermined value for a predetermine amount of time. Furthermore, equalizing the luminance channel may comprise sampling the blanking period; accumulating the samples; calculating a received sample mean by calculating a mean of the samples; and calculating a channel estimate by dividing the received sample mean by a stored sample mean. In addition, equalizing the luminance channel may comprise at least one of repeat the calculated channel estimate, and linearly interpolating the channel estimate with the stored channel estimate and storing the interpolated channel estimate as the stored channel estimate. Moreover, the signal data may comprise an analog television signal and the analog television signal may comprise a color burst. Additionally, equalizing the chrominance channel may comprise sampling the color burst; accumulating the color burst; calculating a mean of the color burst; subtracts the color burst mean from the received color burst producing a color-burst-without-dc signal; calculating a square of the color-burst-without-dc; calculating a root-mean-square of the color-burst-without-dc; and equalizing the chrominance channel by an equalized chrominance channel obtained by dividing the calculated root-mean-square of the color-burst-without-dc signal by $$\left(\frac{A}{\sqrt{2}}\right)$$

where A is an amplitude of a transmitted color burst. Moreover, equalizing the chrominance channel may comprise demodulating the V channel; estimating a chroma channel from the demodulated V channel; and equalizing the chrominance channel to the estimated chroma channel. Furthermore, such a method may further comprise automatically adjusting the received signal data.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
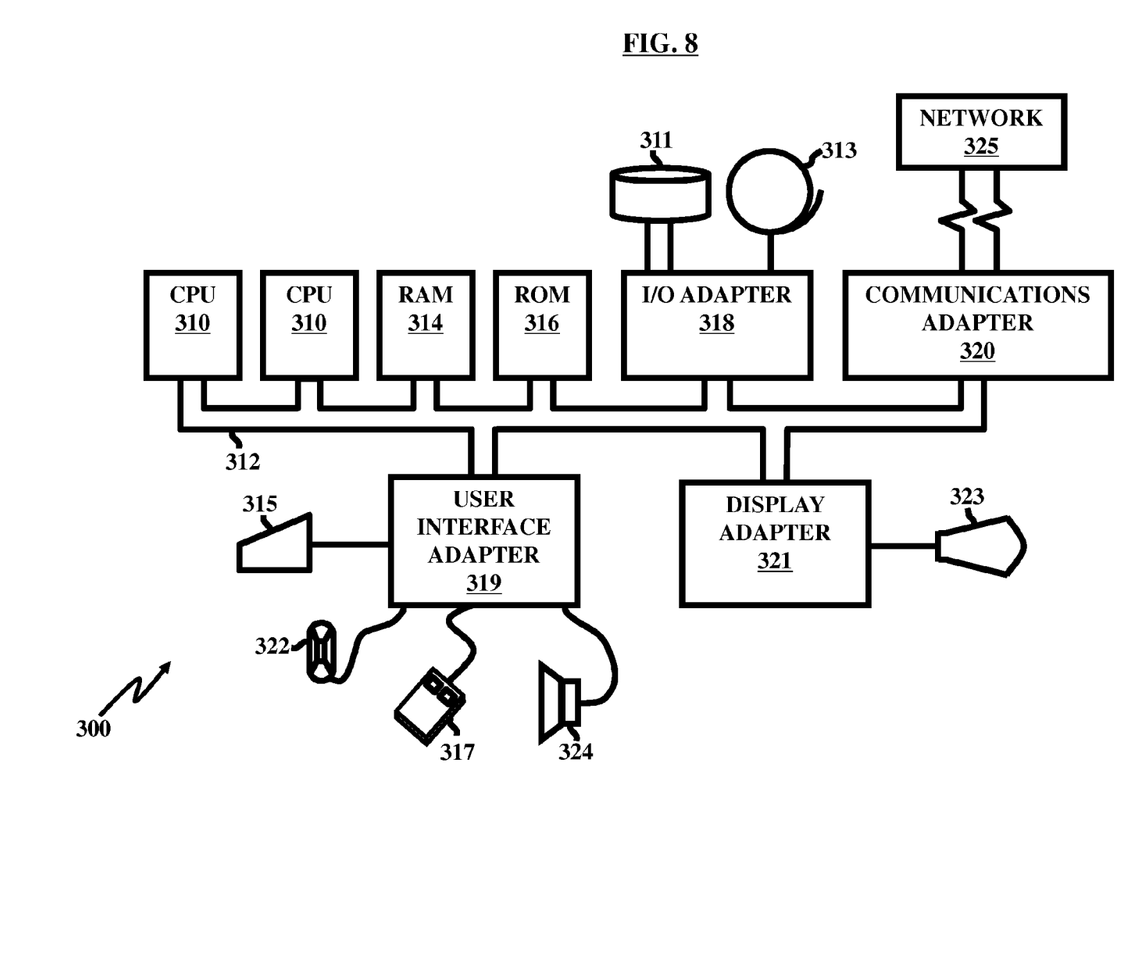
FIG. 8 illustrates a schematic diagram of a computer architecture used in accordance with the embodiments herein.

A more general representation of the hardware environment for practicing the embodiments herein is depicted in FIG. 8. This schematic drawing illustrates hardware configuration 300 of an information handling/computer system in accordance with the embodiments herein. Hardware configuration 300 comprises at least one processor or central processing unit (CPU) 310. The CPUs 310 are interconnected via system bus 312 to various devices such as a random access memory (RAM) 314, read-only memory (ROM) 316, and an input/output (I/O) adapter 318. The I/O adapter 318 can connect to peripheral devices, such as disk units 311 and tape drives 313, or other program storage devices that are readable by the system. The system can read the inventive instructions on the program storage devices and follow these instructions to execute the methodology of the embodiments herein. The system further includes a user interface adapter 319 that connects a keyboard 315, mouse 317, speaker 324, microphone 322, and/or other user interface devices such as a touch screen device (not shown) to the bus 312 to gather user input. Additionally, a communication adapter 320 connects the bus 312 to a data processing network 325, and a display adapter 321 connects the bus 312 to a display device 323 that may be embodied as an output device such as a monitor, printer, or transmitter, for example.

The embodiments described herein provide a simple, but effective, solution for equalizing a received signal in mobile environments; e.g., an analog TV signal in mobility applications. Instead of using complex conventional methods (e.g., using a long complex time domain equalizer), embodiments described herein may use two simple single tap equalizers to equalize the channel amplitude seen by the two main frequency carriers, namely, the luminance and chrominance carriers. For example, in the Luma signal-tap equalizer (e.g., Luma equalizer 50), an interpolation mode is shown in one embodiment to get a more accurate channel estimate for the case of high receiver velocities (which translate to high Doppler frequencies). As the eye is less sensitive to chrominance changes, one embodiment of Chroma equalizer 60 is less complex and removes the added complexity of a linear interpolator to the chroma channel estimate. Along with the two single tap equalizers (e.g., Luma equalizer 50 and Chroma equalizer 60), a noise estimator (e.g., noise variance estimation apparatus 140, shown in FIG. 4) may also be used in the embodiments described herein to provide an accurate signal quality measure. Thus, the signal-to-noise ratio ("SNR") at either the luminance or chrominance carriers can be obtained by dividing the channel power (luminance or chrominance) by the estimated noise variance (as shown in FIG. 4). This SNR measure may be used for enhancing the quality of the output at later stages (e.g., for display processing or display on a display device 321—shown in FIG. 8).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for equalizing signal data, said system comprising:
    an antenna that receives said signal data, wherein said signal data comprises a luminance carrier comprising a luminance channel and a chrominance carrier comprising a chrominance channel;
    an analog-to-digital converter coupled to said antenna that converts the received signal data to digital signal data;
    an instruction memory storing digital equalizer instructions; and
    a digital equalizer system, coupled to said memory and said analog-to-digital converter, wherein said digital equalizer system processes said digital equalizer instructions to:
        estimate a noise variation of said luminance channel;
        equalize said luminance channel; and
        equalize said chrominance channel, wherein the equalization of said chrominance channel is separate and distinct from the equalization of said luminance channel
    wherein said signal data comprises an analog television signal and said analog television signal comprises a blanking period and said blanking period comprises an Hsync, a front porch, and a back porch,
    wherein said Hsync, said front porch, and said back porch comprise an amplitude of said analog television signal at a predetermined value for a predetermined amount of time, wherein said digital equalizer comprises a luminance equalizer, wherein said luminance equalizer equalizes said luminance channel, and wherein said luminance equalizer:
- samples said blanking period;
- accumulates said samples;
- calculates a received sample mean by calculating a mean of said samples; and calculates a channel estimate by dividing said received sample mean by a stored sample mean.

2. The system of claim 1, further comprising an automatic gain controller coupled to said antenna, wherein said automatic gain controller automatically adjusts said received signal data and said analog-to-digital converter converts the adjusted signal data to digital video signal data.

3. The system of claim 1, wherein said luminance equalizer repeats the calculated channel estimate.

4. The system of claim 1, wherein said luminance equalizer interpolates said channel estimate by linearly interpolating said channel estimate with said stored channel estimate and storing the interpolated channel estimate as said stored channel estimate.

5. The system of claim 1, further comprising an automatic gain controller coupled to said analog-to-digital converter.

6. The system of claim 1, wherein said digital equalizer comprises a chrominance equalizer to equalize said chrominance channel.

7. The system of claim 6, wherein said chrominance equalizer comprises at least one of an Root-Mean-Square ("RMS") equalizer and a V-demod equalizer, wherein said V-demod equalizer comprises a demodulator, and wherein said V-demod equalizer equalizes said chrominance channel based on an output of said demodulator.

8. The system of claim 7, wherein said RMS equalizer:
- samples said color burst;
- accumulates said color burst;
- calculates a mean of said color burst;
- subtracts said color burst mean from the received color burst producing a color-burst-without-dc signal;
- calculates a square of said color-burst-without-dc signal;
- calculates a root-mean-square of said color-burst-without-dc signal; and
- equalizes said chrominance channel by an equalized chrominance channel obtained by dividing the calculated root-mean-square of said color-burst-without-dc signal by $$\left(\frac{A}{\sqrt{2}}\right),$$

where A is an amplitude of a transmitted color burst.

9. The system of claim 7, wherein said signal data comprises a composite analog television signal and said composite analog television signal comprises a V channel.

10. The system of claim 9, wherein said V-demod equalizer:
- demodulates said V channel;
- estimates a chroma channel from the demodulated V channel; and
- equalizes the received signal data by the estimated chroma channel.

11. A system for equalizing signal data, said system comprising:
- an antenna that receives said signal data, wherein said signal data comprises a luminance carrier comprising a luminance channel and a chrominance carrier comprising a chrominance channel, and wherein said signal data comprises an analog television signal and said analog television signal comprises a color burst, and;
- an analog-to-digital converter coupled to receiving antenna that converts the received signal data to digital signal data;
- an instruction memory storing digital equalizer instructions; and
- a digital equalizer system, coupled to said memory and said analog-to-digital converter, wherein said digital equalizer comprises a chrominance equalizer to equalize said chrominance channel, and wherein said digital equalizer system processes said digital equalizer instructions to:
  - estimate a noise variation of said luminance channel;
  - equalize said luminance channel; and
  - equalize said chrominance channel, wherein the equalization of said chrominance channel is separate and distinct from the equalization of said luminance channel, wherein said chrominance equalizer comprises at least one of an Root-Mean-Square ("RMS") equalizer and a V-demod equalizer, wherein said V-demod equalizer comprises a demodulator, and wherein said V-demod equalizer equalizes said chrominance channel based on an output of said demodulator.

12. The system of claim 11, wherein said RMS equalizer:
- samples said color burst;
- accumulates said color burst;
- calculates a mean of said color burst;
- subtracts said color burst mean from the received color burst producing a color-burst-without-dc signal;
- calculates a square of said color-burst-without-dc signal;
- calculates a root-mean-square of said color-burst-without-dc signal; and
- equalizes said chrominance channel by an equalized chrominance channel obtained by dividing the calculated root-mean-square of said color-burst-without-dc signal by $$\left(\frac{A}{\sqrt{2}}\right),$$

where A is an amplitude of a transmitted color burst.

13. The system of claim 11, wherein said signal data comprises a composite analog television signal and said composite analog television signal comprises a V channel, and wherein said V-demod equalizer:
- demodulates said V channel;
- estimates a chroma channel from the demodulated V channel; and
- equalizes the received signal data by the estimated chroma channel.

14. A method of equalizing signal data, said method comprising:
- receiving said signal data, wherein said signal data comprises a luminance carrier comprising a luminance channel and a chrominance carrier comprising a chrominance channel;
- converting said signal data to digital signal data;
- estimating a noise variation of said luminance channel;
- equalizing said luminance channel; and
- equalizing said chrominance channel, wherein said equalization of said chrominance channel is separate and distinct from said equalization of said luminance channel, and wherein said equalizing said chrominance channel comprises: demodulating said V channel; estimating a chroma channel from the demodulated V channel; and equalizing said chrominance channel to the estimated chroma channel.

16. The method of claim 14, wherein said signal data comprises an analog television signal and said analog television signal comprises a blanking period and said blanking period comprises an Hsync, a front porch, and a back porch, and wherein said Hsync, said front porch and said back porch comprise an amplitude of said analog television signal at a predetermined value for a predetermine amount of time.

16. The method of claim 14, wherein equalizing said luminance channel comprises:
    sampling said blanking period;
    accumulating said samples;
    calculating a received sample mean by calculating a mean of said samples; and
    calculating a channel estimate by dividing said received sample mean by a stored sample mean.

17. The method of claim 15, wherein equalizing said luminance channel comprises at least one of:
    repeating the calculated channel estimate, and
    linearly interpolating said channel estimate with the stored channel estimate and storing the interpolated channel estimate as said stored channel estimate.

18. The method of claim 14, wherein said signal data comprises an analog television signal and said analog television signal comprising a color burst.

19. The method of claim 14, wherein equalizing said chrominance channel comprises:
    sampling said color burst;
    accumulating said color burst;
    calculating a mean of said color burst;
    subtracts said color burst mean from the received color burst producing a color-burst-without-dc signal;
    calculating a square of said color-burst-without-dc;
    calculating a root-mean-square of said color-burst-without-dc; and
    equalizing said chrominance channel by an equalized chrominance channel obtained by dividing the calculated root-mean-square of said color-burst-without-dc signal by $$\left(\frac{A}{\sqrt{2}}\right),$$

where A is an amplitude of a transmitted color burst.

20. The method of claim 14, further comprising automatically adjusting said received signal data.

* * * * *

UNITED STATES PATENT AND TRADEMARK OFFICE
CERTIFICATE OF CORRECTION

PATENT NO. : 8,305,498 B2
APPLICATION NO. : 12/759665
DATED : November 6, 2012
INVENTOR(S) : Ahmed Ragab Elsherif, Mohamed Abd El-Salam Ali and Nabil Yousef Wasily It is certified that error appears in the above-identified patent and that said Letters Patent is hereby corrected as shown below:

In column 17, line 2, delete "said V channel" and in its place, insert -- "a V channel" --.

Signed and Sealed this
Nineteenth Day of February, 2013

Teresa Stanek Rea
*Acting Director of the United States Patent and Trademark Office*